US006442555B1

(12) United States Patent
Shmueli et al.

(10) Patent No.: US 6,442,555 B1
(45) Date of Patent: Aug. 27, 2002

(54) AUTOMATIC CATEGORIZATION OF DOCUMENTS USING DOCUMENT SIGNATURES

(75) Inventors: Oded Shmueli, Nofit; Michael Elad, Haifa; Darryl Greig, Haifa; Carl Staelin, Haifa, all of (IL)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/428,136

(22) Filed: Oct. 26, 1999

(51) Int. Cl.[7] .............................................. G06F 17/30
(52) U.S. Cl. .............................. 707/101; 707/3; 707/6; 707/517; 707/522; 707/531; 707/100
(58) Field of Search ........................... 271/11; 345/837, 345/839; 707/3, 6, 10, 100, 517, 522, 531, 101; 382/224

(56) References Cited

U.S. PATENT DOCUMENTS

| | | | | |
|---|---|---|---|---|
| 5,265,242 A | * | 11/1993 | Fujisawa et al. | 382/231 |
| 5,463,773 A | * | 10/1995 | Sakakibara et al. | 382/226 |
| 5,493,677 A | * | 2/1996 | Balogh et al. | 707/104.1 |
| 5,568,640 A | * | 10/1996 | Nishiyama et al. | 707/1 |
| 5,628,003 A | * | 5/1997 | Fujisawa et al. | 382/181 |
| 5,675,710 A | * | 10/1997 | Lewis | 706/12 |
| 5,924,090 A | * | 7/1999 | Krellenstein | 707/3 |
| 6,044,375 A | * | 3/2000 | Shmueli et al. | 706/20 |

OTHER PUBLICATIONS

Cohen et al., "Context–Sensitive learning methods for text categorization", ACM transactions, vol. 17, No. 2, pp. 141–173, Apr. 1999.*

Theodoridou et al., "Multimedia document presentation, information extraction, and document formation in MINIS: A model and a system", ACM Transactions, vol.4, No. 4, pp. 345–383, Oct. 1986.*

(List continued on next page.)

Primary Examiner—Jean M. Corrielus

(57) ABSTRACT

A method of quickly and automatically comparing a new document to a large number of previously seen documents and identifying the document type. First, provide a plurality of document type distributions, each document type distribution describes layout characteristics of an independent document type and may include a plurality of data points. Each document type distribution includes data derived from at least one basis document signature which may include data defining pixels of a low-resolution image of the independent basis document resolved to between 1 and 75 dots per inch or may include document segmentation data derived from the independent basis document. Next provide a new electronic document. Then create new document signature from the new electronic document. Next, distances between the new document signature and each of the plurality of document type distributions are calculated using an algorithm based on a Bayesian framework for a Gaussian distribution. The distances calculated may be Euclidean distances or may be Mahalanobis distances. Additionally, calculating the distances may include weighting the value given each of a plurality of data points in the document signatures based on the usefulness of each of the plurality of data points in distinguishing between the document signatures. Next, select at least one candidate document type for the new electronic document from among the independent document types described by the plurality of document type distributions. The selection of the at least one candidate document type may include selecting a preselected fixed number of the independent document types or may include selecting the independent document types described by those of the plurality of document type distributions having calculated distances that are within a preselected threshold distance of the smallest of the distances calculated. In addition, the invention provides for a program storage medium readable by computer, tangibly embodying a program of instructions executable by the computer to perform the method steps described above.

22 Claims, 11 Drawing Sheets

OTHER PUBLICATIONS

Croft et al., "Implementing ranking strategies using text signatures", ACM Transactions, vol. 6, No. 1, pp. 42–62, Jan. 1988.*

Document Analysis Systems II pp. 283–300.

Document Analysis Systems II pp. 385–405.

Essence and Accidents of Software Engineering.

Automated Title Page Cataloging: A Feasibility Study.

Jianying Hu et al., "Document Image Layout Comparison and Classification", Proceedings of the $5^{th}$ International Conference on Document Understanding and Recognition (ICDAR '99). Pp. 285–288.

Richard Casey et al., "Intelligent Forms Processing System", Machine Vision and Applications, 1992, 5, pp. 143–155.

A. Dengel et al., "OfficeMAID—A System for Office Mail Analysis, Interpretation and Delivery", Proceedings First International Conference Document Analysis and Recognition, Kaiserlauten, Germany, Oct. 1994, pp. 253–275.

M. Krishnamoorthy et al., "Syntactic Segmentation and Labeling of Digitized Pages from Technical Journals", IEEE Transactions on Pattern Analysis and Machine Intelligence, vol. 15, No. 7, Jul. 1993, pp. 737–747.

S. W. Lam, "An Adaptive Approach to Document Classification and Understanding" Internations Association for Pattern Recognition Workshop on Document Analysis Systems, (1994) pp. 114–134.

D. Savic, "Automatic Classification of Office Documents: Review of Available Methods and Techniques", Records Management Quarterly, Oct. 1995, pp. 3–18.

Sargau N. Srihari et al., "Document Understanding: Research Direction", Technical Report CEDAR–TR–92–1, Center for Excellence for Document Analysis and Recognition, State University of New York at Buffalo, May 1992, pp. 1–30.

Oded Shmueli, et al., "Extracting Bibliographic Information from Documents", Technical Report HPL–98–02, HP Laboratories, Jan. 1998, pp. 1–26.

Claudia Wenzel, "Supporting Information Extraction from Printed Documents by Lexicosemantic Pattern Matching", Proceedings of the Fourth International Conference on Document Analysis and Recognition, IEEE Computer Society Press, 1997, pp. 732–735.

Toyohide Watanabe et al., "Automatic Acquisition of Layout Knowledge for Understanding Business Cards", Proceedings of the Fourth International Conference on Document Analysis and Recognition, IEEE Computer Society Press, 1997, pp. 216–220.

H. Walischewski, "Automatic Knowledge Acquisition for Spatial Document Interpretation", Proceedings of the Fourth International Conference on Document Analysis and Recognition, IEEE Computer Society Press, 1997, pp. 243–247.

* cited by examiner

106

AUTOMATIC CATEGORIZATION OF DOCUMENTS USING DOCUMENT SIGNATURES

BACKGROUND OF THE INVENTION

1. Field of the Invention

The present invention relates generally to document classification systems and more particularly to a method of quickly and automatically classifying a new document by comparison against a number of documents of known type.

2. Description of the Related Art

As the number of documents being digitally captured and distributed in electronic form increases, there is a growing need for techniques to quickly classify the purpose or intent of digitally captured documents.

At one time document classification was done manually. An operator would visually scan and sort the documents by document type. This process was tedious, time consuming, and expensive. As computers have become more commonplace, the quantity of new documents including on-line publications has increased greatly and the number of electronic document databases has grown almost as quickly. As the number of documents being digitally captured and distributed in electronic form increases, the old, manual methods of classifying documents are simply no longer practical.

A great deal of work on document classification and analysis has been done in the areas of document management systems and document recognition. Specifically, the areas of page decomposition and optical character recognition (OCR) are well developed in the art. Page decomposition involves automatically recognizing the organization of an electronic document. This usually includes determining the size, location, and organization of distinct portions of an electronic document. For example, a particular page of an electronic document may include data of various types including paragraphs of text, graphics, and spreadsheet data. The page decomposition would typically be able to automatically determine the size and location of each particular portion (perhaps by indicating a perimeter), as well as the type of data found in each portion. Some page decomposition software will go further than merely determining the type of data found in each portion, and will also determine format information within each portion. For example, the font, font size, and justification may be determined for a block containing text.

OCR involves converting a digital image of textual information into a form that can be processed as textual information. Since electronically captured documents are often simply optically scanned digital images of paper documents, page decomposition and OCR are often used together to gather information about the digital image and sometimes to create an electronic document that is easy to edit and manipulate with commonly available word processing and document publishing software. In addition, the textual information collected from the image through OCR is often used to allow documents to be searched based on their textual content.

There have also been a number of systems proposed which deal with classifying and extracting data from multiple document types, but many of these rely on some sort of identity string printed on the document itself. There are also systems available for automatically recognizing a new form as particular form out of a forms database based on the structure of lines on the form. These systems rely, however, on the fixed structure and scale of the documents involved. Finally, there are expert systems that have been designed using machine learning techniques to classify and extract data from diverse electronic documents. One such expert system is described in U.S. patent application Ser. No. 09/070,439 entitled "Automatic Extraction of Metadata Using a Neural Network, now U.S. Pat. No. 6,044,375." Machine learning techniques generally require a training phase which may demand a good deal of computational power. Therefore these classification systems may be made to operate much more efficiently to extract data from documents if the document type of a new document is known.

From the foregoing it will be apparent that there is still a need for a method to quickly and automatically compare a new document to a number of previously seen documents of known type to classify the new document as either belonging to a known type, or as belonging to a new type.

SUMMARY OF THE INVENTION

The invention provides a method of quickly and automatically comparing a new document to a number of previously seen documents and identifying the document type. The method of the invention begins by providing a plurality of document type distributions, each document type distribution describes layout characteristics of an independent document type and may include a plurality of data points. Each document type distribution includes data derived from at least one basis document signature. A basis document signature includes a plurality of data points which can be computed from an individual basis document. The data points may represent a low-resolution image of the basis document, a low-resolution representation of the document segmentation of the basis document, or some other similar representation of the basis document. The data derived from the at least one basis document signature may include a multiple representative statistic value such as a mean or median value of each of the data values across each of the at least one document signatures.

The next step is providing a new electronic document. Then a new document signature is created from the new electronic document. The new document signature describes the layout characteristics of the new electronic document and may include data defining pixels of a low-resolution image of the new electronic document, a low-resolution representation of the document segmentation of the new electronic document, or some other similar representation of the new electronic document.

Next, distances between the new document signature and each of the plurality of document type distributions are calculated. The distances may be calculated using distance measures known in the art, such as Euclidean distance, Mahalanobis distance, an algorithm based on a Bayesian framework for a Gaussian distribution, or other measures. Additionally, distance calculations may weight the value given each of a plurality of data points in the basis document signatures or the document type distributions based on the usefulness of that data point in distinguishing between the various document types or the reliability of that point in specifying a particular document type. The reliability of each of the plurality of data points may be calculated, for example, based on the ratio of the spread of that data point within all basis documents of that document type to a spread of that data point across all of the plurality of the basis documents.

Based on the distances calculated, at least one candidate document type for the new electronic document is selected from among the independent document types described by the plurality of document type distributions. The selection of the at least one candidate document type may include selecting a preselected fixed number of the independent document types. The preselected fixed number of independent document types may be those described by the preselected fixed number of the plurality of document type distributions calculated to have the preselected fixed number of shortest distances. Alternatively, the selection of the at least one candidate document type may include selecting the independent document types described by those of the plurality of document type distributions having calculated distances that are within a preselected threshold distance of a shortest of the distances calculated. Further, the selection algorithm of the at least one document type may declare that the new electronic document is of a new type.

In addition, the invention provides for a program storage medium readable by computer, tangibly embodying a program of instructions executable by the computer to perform the method steps described above. Other aspects and advantages of the invention will become apparent from the following detailed description, taken in conjunction with the accompanying drawings and the attached pseudo code listing, illustrating by way of example the principles of the invention.

DESCRIPTION OF THE PREFERRED EMBODIMENT

Figure 1:
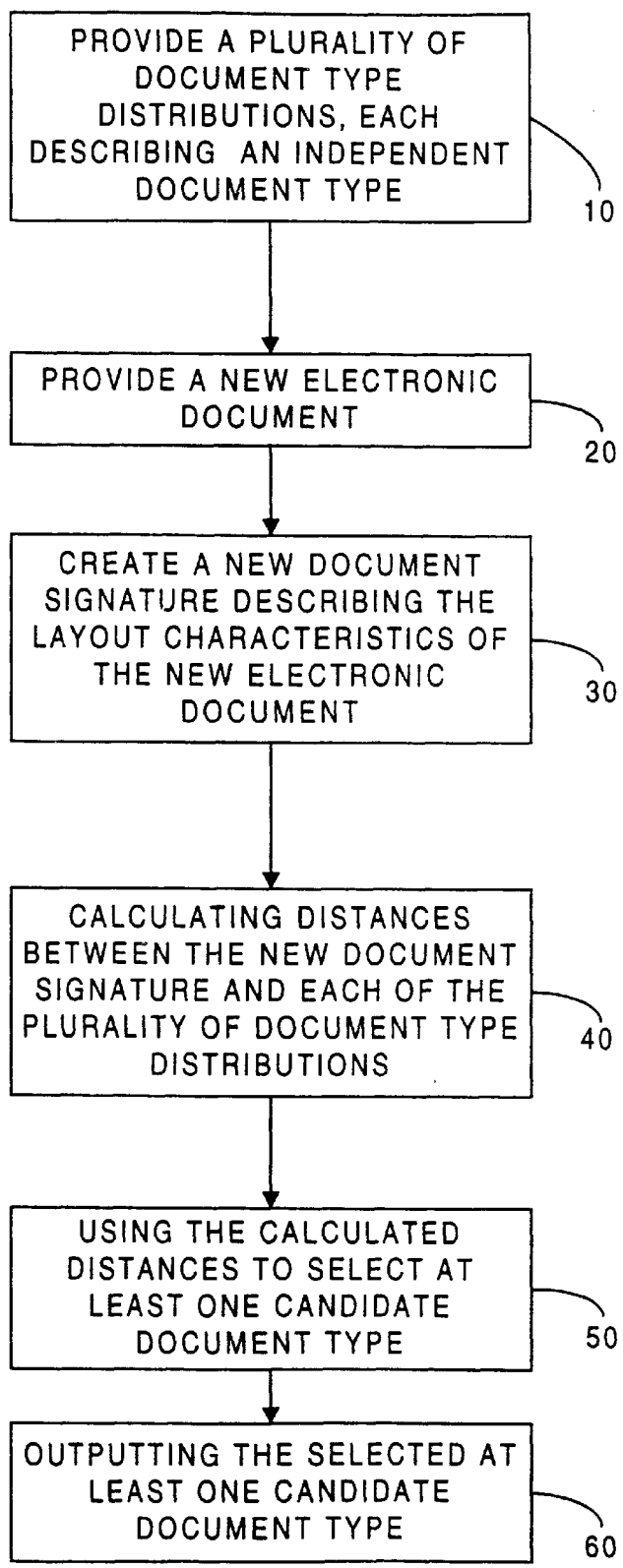
FIG. 1 is a flowchart depicting the method of the invention.

As the number of documents being digitally captured and distributed in electronic form increases, there is a growing interest in techniques for quickly classifying the purpose or intent of digitally captured documents using only the electronic image of the captured document. In particular, given a new (unseen) image of a document, there is a need for a method that can quickly sift through a large number of previously seen documents of known type and either assign a known type to the new document, or else declare that the document is of a new type.

As shown in the drawings for purposes of illustration, the invention provides a method of quickly and automatically comparing a new electronic document against a large number of documents of known document type. This comparison is done to classify the type of the new electronic documents or to indicate that a new electronic document does not belong to one of the known document types.

The invention is based, in part, on the inventors' observation that the level of analysis required to correctly classify a document image is related to the variance observed in the structure of the documents of each class. This is also the experience of a human reader who is presumed to be familiar with the formats of each class. For highly structured classes with low variance between the structure of individual documents in the class, a human expert can accurately classify a document given only a very low-resolution "thumbnail" image of the document. As the variance in structure of the individual documents in a class increases, higher resolution images are required by the human reader until, in the extreme case of free format documents, classification can only be done by reading and analyzing the textual content. This is equivalent to doing OCR and semantic analysis of the text.

The method according to the invention is intended to deal primarily with classifying documents in the more structured end of the spectrum, although it is useful for dealing with less structured documents including free form documents. For example, a well designed document classifying system will lower the computational cost by excluding known document types in a pre-processing step prior to more expensive semantic processing.

FIG. 1 is a flowchart illustrating the method according to the invention of automatically extracting metadata from a document. Briefly, the method of classifying electronic documents begins by providing a plurality of document type distributions (block 10). Each document type distribution is a collection of data from which sample statistics on the document type may be drawn. The sample statistics required and a typical implementation will be discussed below in detail. Next, a new electronic document is provided (block 20). A new electronic document is then created from the new electronic document (block 30). Next the distance between the new document signature and the plurality of document type distributions is calculated (block 40). At least one candidate document type is then selected based on the calculated distances (block 50). The selected at least one candidate document type is then output (block 60).

More specifically, the first step is providing a plurality of document type distributions (block 10). For purposes of this description, a document type distribution is any collection of data from which sample statistics on the document type distribution may be drawn. This collection of data should be able to provide sample statistics for the mean and covariance of the multivariate random variable consisting of the plurality of data points which make up the basis document signature of any basis document of that document type. This collection of data typically consists of at least one but often many more basis document signatures from basis documents drawn at random from the population of all basis documents of that document type. The document type distribution describes the layout characteristics of the independent document type.

The basis document signature from each independent basis document is typically a coarse representation of the layout of the independent basis document. For each independent document type the associated basis document signatures are assumed to be a representative sample of the set of documents of that document type and may provide sample statistics for the distribution of that document type. While two different types of basis document signatures, low-resolution image type and document segmentation type, are described in detail below, other types of basis document signatures may be used in the method according to the invention.

The document type distribution may include a variety of information from the basis document signatures. This information may include, but is not limited to: 1) all the data from each of the basis document signatures of the independent document type; 2) all the data from a sampling of the basis document signatures of the independent document type; 3) particularized data from each of the basis document signatures of the independent document type; 4) multiple representative statistics such as mean, median, mode and standard deviations derived from the data in each of the basis document signatures of the independent document type; 5) statistical information derived from the data of a sampling of the basis document signatures of the independent document type; and 6) any combination of the above.

Figure 2A:
FIG. 2A is a first sample basis document signature of the low-resolution image type from a first document type.
Figure 2B:
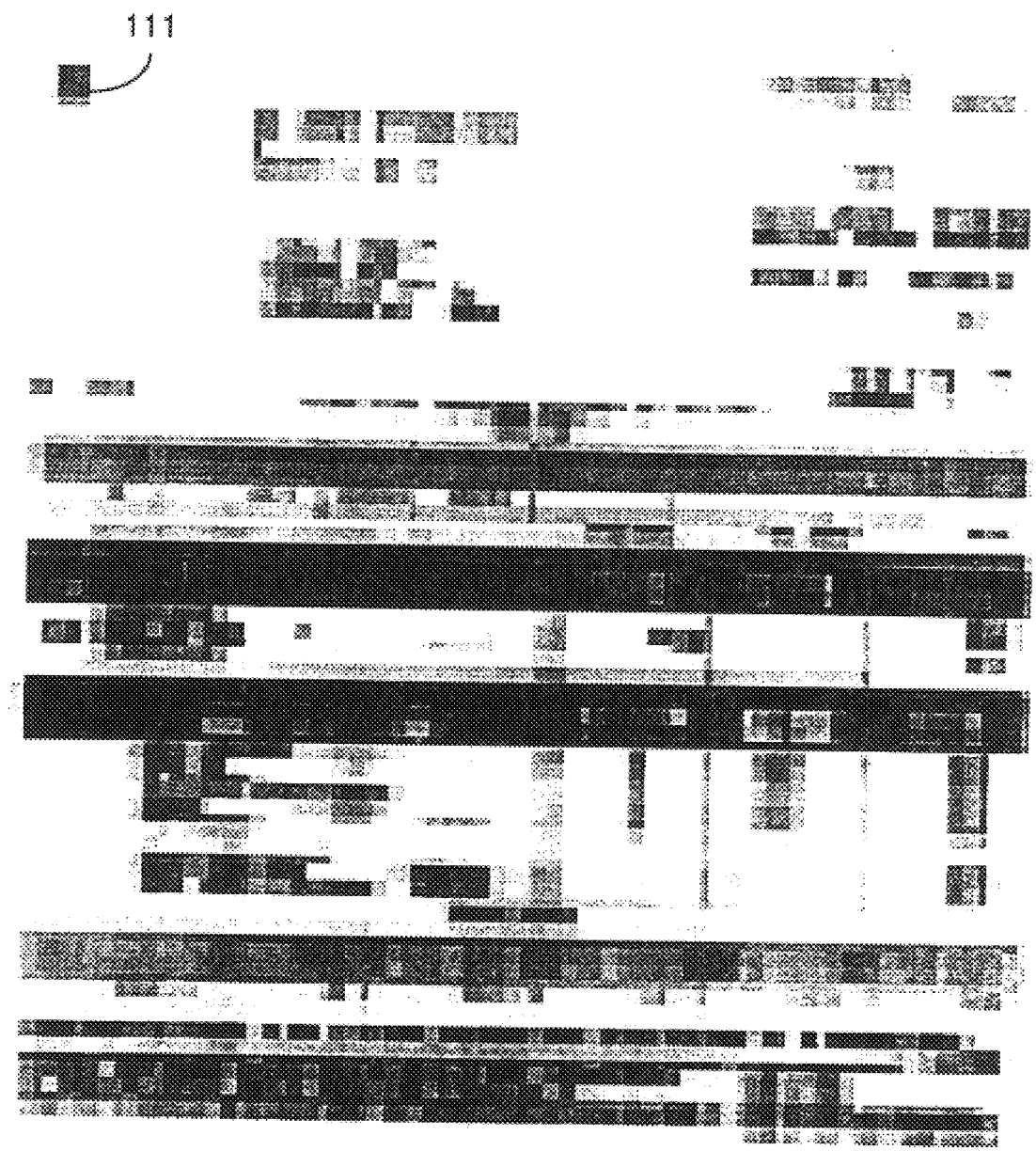
FIG. 2B is a second sample basis document signature of the low-resolution image type from a second document type.
Figure 2C:
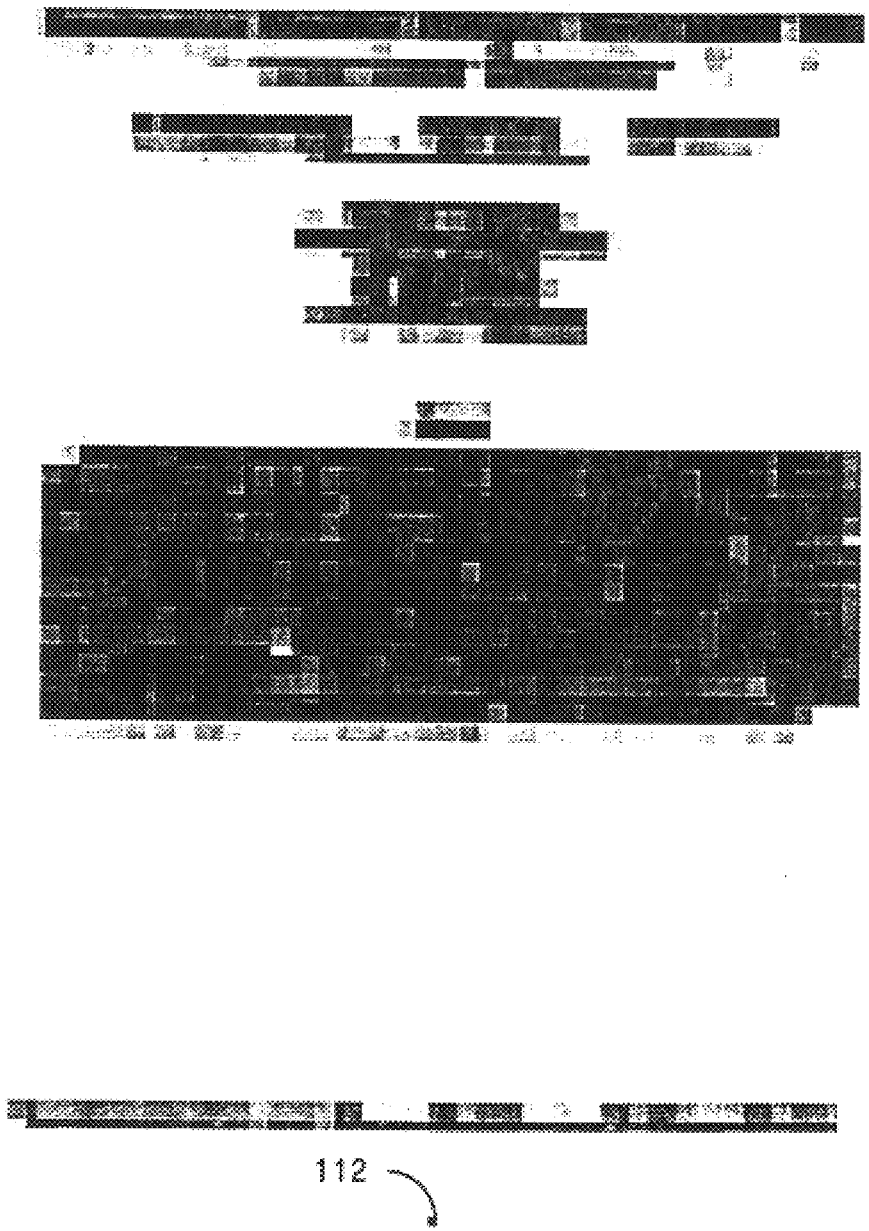
FIG. 2C is a third sample basis document signature of the low-resolution image type from a third document type.

A first type of basis document signature which may be used is the low-resolution image type which is also known as a "thumbnail" image type. Three examples of low-resolution image type basis document signatures 101, 102, 103 are depicted in FIGS. 2A–2C, respectively. The low-resolution image type of basis document signature is achieved by down-scaling the original document image for each basis document of the particular document type. The original document images typically have a resolution of 300 dots per linear inch (dpi). Each of the dots is usually referred to as a "pixel". With an 8 inch by 11 inch document, this corresponds to 2400 pixels by 3300 pixels for a total of 7,920,000 pixels per document. By reducing the resolution of the image to between 3 dpi and 9 dpi an image of between 24 pixels by 33 pixels and 72 pixels by 99 pixels, respectively, is created. These correspond to low-resolution document images with between 729 pixels per document and 7128 pixels per document, or a decrease in the total number of pixels by a factor of between 100 and 1,000. The example low-resolution image type basis document signatures 101–103 are at a resolution of 9 dpi and a sample pixel 110–112 is indicated on each document signature, respectively. For purposes of this description, a low-resolution document image may be as high as 75 dpi, but is preferably below 15 dpi.

Often, thumbnail images of document images are created automatically by commercially available document scanning software so that documents can be easily previewed and selected by users. Thus, the thumbnail images that form the document signatures can often be provided with little or no additional computational cost which is important, particularly when processing a large set of documents. It is also possible to use lower resolution images down to 1 dpi or below to further reduce computational and memory requirements, however reducing the resolution below 3 dpi can substantially reduce the accuracy of the method according to the invention as will be discussed below.

The "thumbnail" images from each basis document of a particular document type are then used to create a document type distribution for that document type using any of the techniques described above. For example, one way to create a document type distribution would be to combine each of the low-resolution type basis document signatures into a single "thumbnail" image that is a "mean image" representing the document type. The method for creating this "mean image" this will depend on whether the thumbnail images from the basis documents are binary or grayscale. Binary pixels are either black or white, while grayscale pixels are defined as a point along a scale between completely black and completely white. Typically a grayscale pixel will be broken into 256 increments, or levels of gray.

If the thumbnail images are binary, then each pixel is compared to the corresponding pixel on the other basis document thumbnail images. If there are more black pixels than white pixels, the corresponding pixel is set to black in the document type distribution. Similarly, if there are more white pixels than black pixels for a particular pixel location on each of the basis documents, then the corresponding pixel in the document type distribution is set to white. If an equal number of black pixels and white pixels exist for a particular pixel location on each of the basis documents, then the corresponding pixel in the document type distribution is set randomly to black or white.

If the thumbnail images are grayscale, then each pixel is compared to the corresponding pixel on the other basis document thumbnail images and an average level of gray is calculated. Thus, if there are three basis document thumbnail images and the first pixel of each has a gray level of 25, 175, and 250, respectively, then the corresponding pixel 110 in the document type distribution is set to a level of 150=(25+175+250)/3.

Figure 3A:
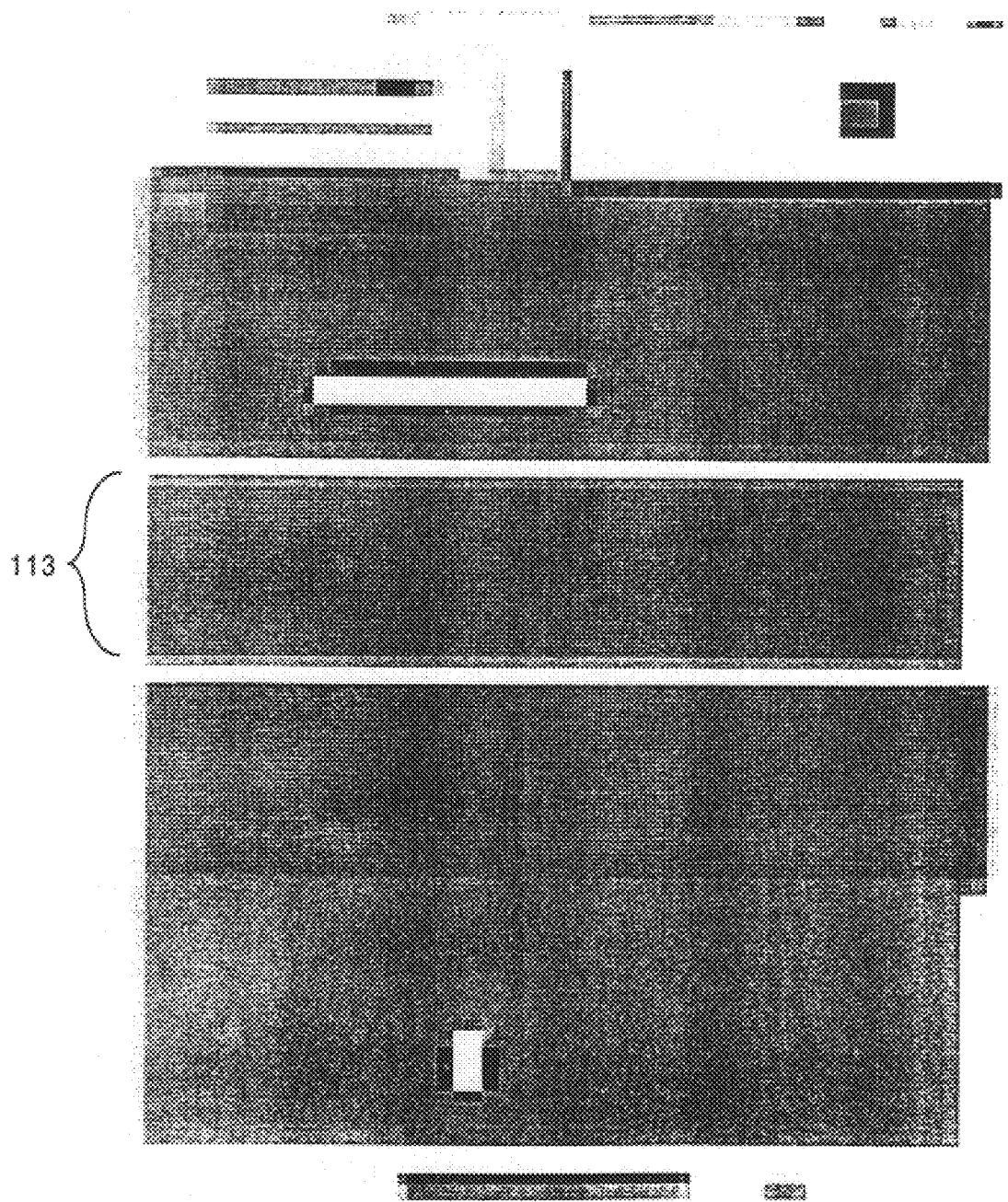
FIG. 3A is a fourth sample basis document signature of the document segmentation type from the same document type as shown in FIG. 2A.
Figure 3B:
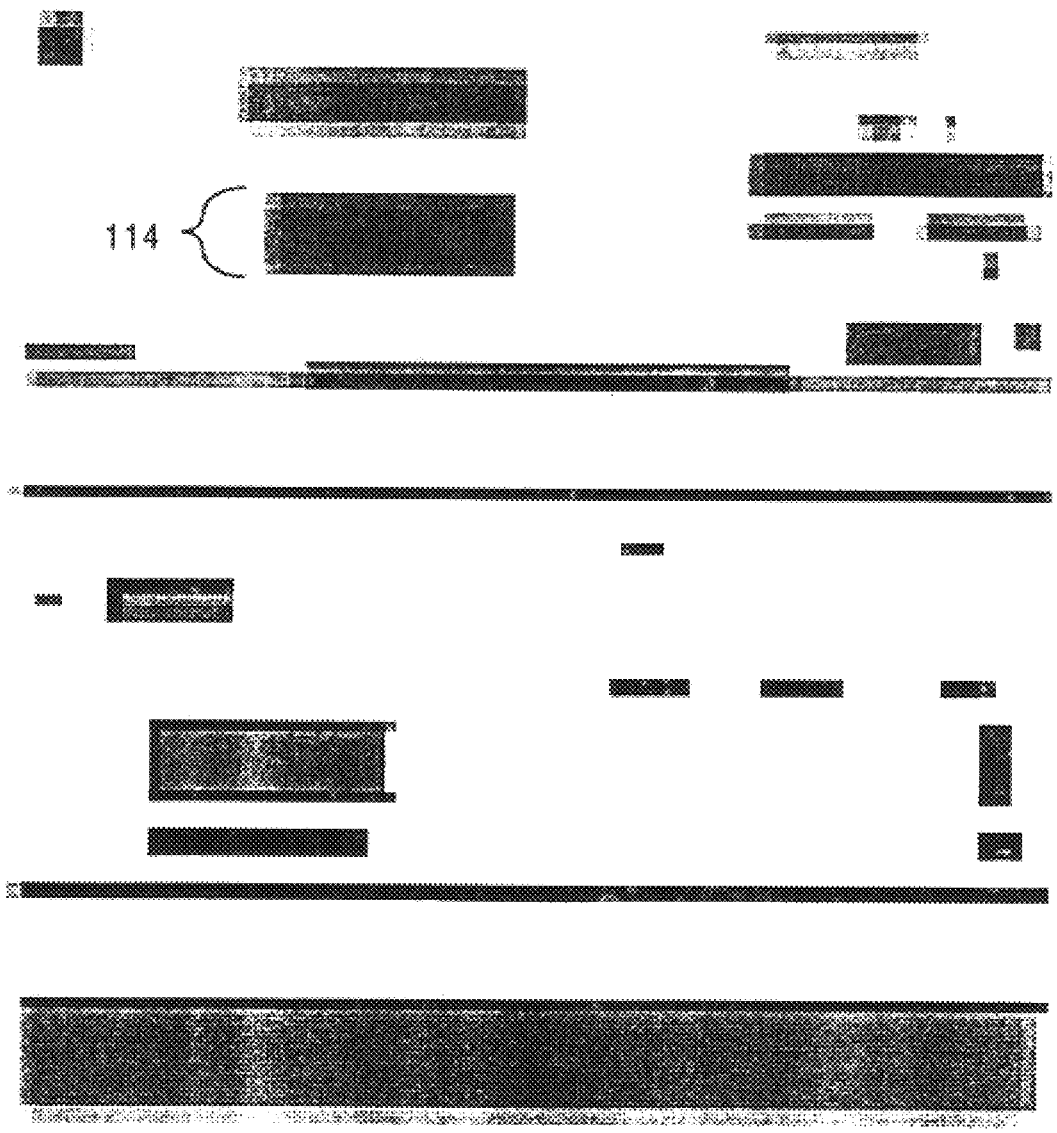
FIG. 3B is a fifth sample basis document signature of the document segmentation type from the same document type as shown in FIG. 2B.
Figure 3C:
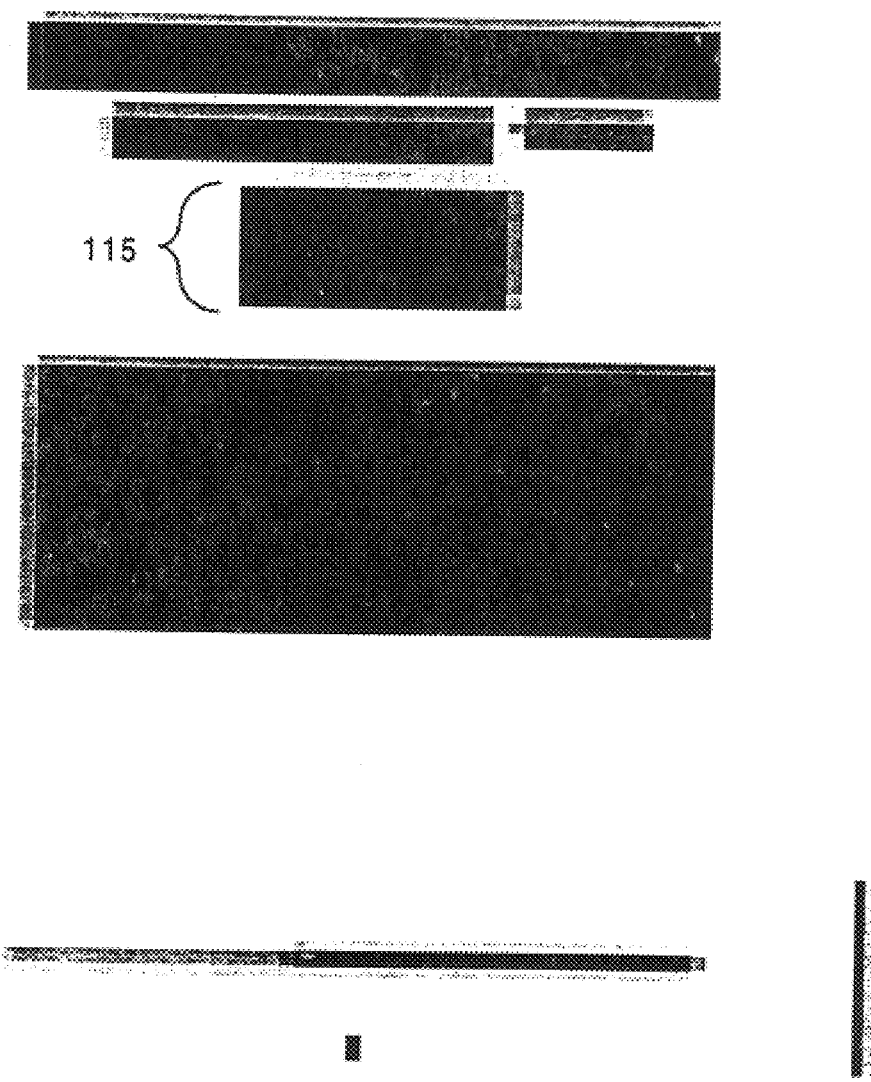
FIG. 3C is a sixth sample basis document signature of the document segmentation type from the same document type as shown in FIG. 2C.

A second type of document signature that may be used is a document segmentation type. Three examples of document segmentation type document signatures, 104, 105, and 106 are depicted in FIGS. 3A–3C, respectively. The document segmentation type of document signature is stylized representation of the document type built from the output of a page decomposition algorithm from each of the basis documents of that document type. Page decomposition algorithms are known in the art and are typically included in commercially available document scanning software. Traditionally the output of a page decomposition algorithm is a collection of geometric shapes marking discrete blocks on the page. The page decomposition algorithms can either provide binary block data or weighted block data dependent on, for example, the font size in a text block, or some other pixel density measure in general. In some cases, the output of the page decomposition algorithm for each basis document can be obtained at no or low computational cost, by simply siphoning the necessary numbers into a file as part of the page decomposition done prior to optical character recognition (OCR) processing of a document.

The output of the page decomposition algorithm from each of the basis documents are used to create the document segmentation type of basis document signature for that basis document. The basis document signatures for each of the independent basis documents of a particular document type may be combined into a document type distribution using any of the techniques described above. For example, document type distributions may be formed by averaging document segmentation signature data values to create a "mean segmentation image." The averaging process will depend on whether the output of the page decomposition algorithm was binary or weighted. For binary output, blocks with no data are defined by a 0 value while block containing data (text or otherwise) are defined with a 1 value. Each location in a basis document is compared against the corresponding location in the other basis documents. The locations will typically correspond to the pixel locations in the low-resolution image type document signatures. If there are more 1 values for the location than 0 values, the corresponding location in the document type distribution is assigned a 1 value. Similarly, if there are more 0 values for the location than 1 values, the corresponding location in the document type distribution is assigned a 0 value. If there are an equal number of 0 values and 1 values for the location, the corresponding location in the document type distribution is randomly assigned a 1 value or a 0 value. This process creates blocks of average size and location in the document segmentation type document signature.

For weighted output, blocks are given weighted values depending on their contents or pixel density as discussed above. Thus, for example, each block may have a weighted value of between 0 and 15. Each location in a basis document is compared against the corresponding location in the other basis documents and the weighted values for that location in each basis document are averaged. Thus, for example, if there are three basis documents with weighted values for a particular location of 2, 10, and 12, the average value assigned to that location in the document signature would be 8=(2+10+12)/3. Once again, the locations will typically correspond to the pixel locations in the low-resolution image type document signatures. This process creates blocks of average size, location, and weight in the document type distribution.

Next, a new electronic document is provided (block 20). The new electronic document is usually of unknown type and there is a need to classify the new electronic document as either belonging to one of the known document types represented by the document signatures or as a new type not yet defined by a document signature. The electronic document may be an optically scanned paper document, or an electronic image of the document derived in any number of other ways known in the art.

A new document signature containing data describing the page layout of the new electronic document is then created from the new electronic document (block 30). The new document signature may have a variety of forms, but should be of the same type as the basis document signatures that were used to form the plurality of document type distributions provided (block 10). Thus, if the plurality of basis document signatures were of the low-resolution image type at a resolution of 9 dpi with binary pixels, the new document signature should be of the low-resolution image type with the same resolution and binary pixels. The new document signature can be created in the same manner as described above for capturing the information from each basis document that contributed to the plurality of document signatures. Thus, creating a new document signature may be as simple as capturing the thumbnail image from commercially available scanning software or siphoning off the data from commercially available page decomposition software.

Figure 4:
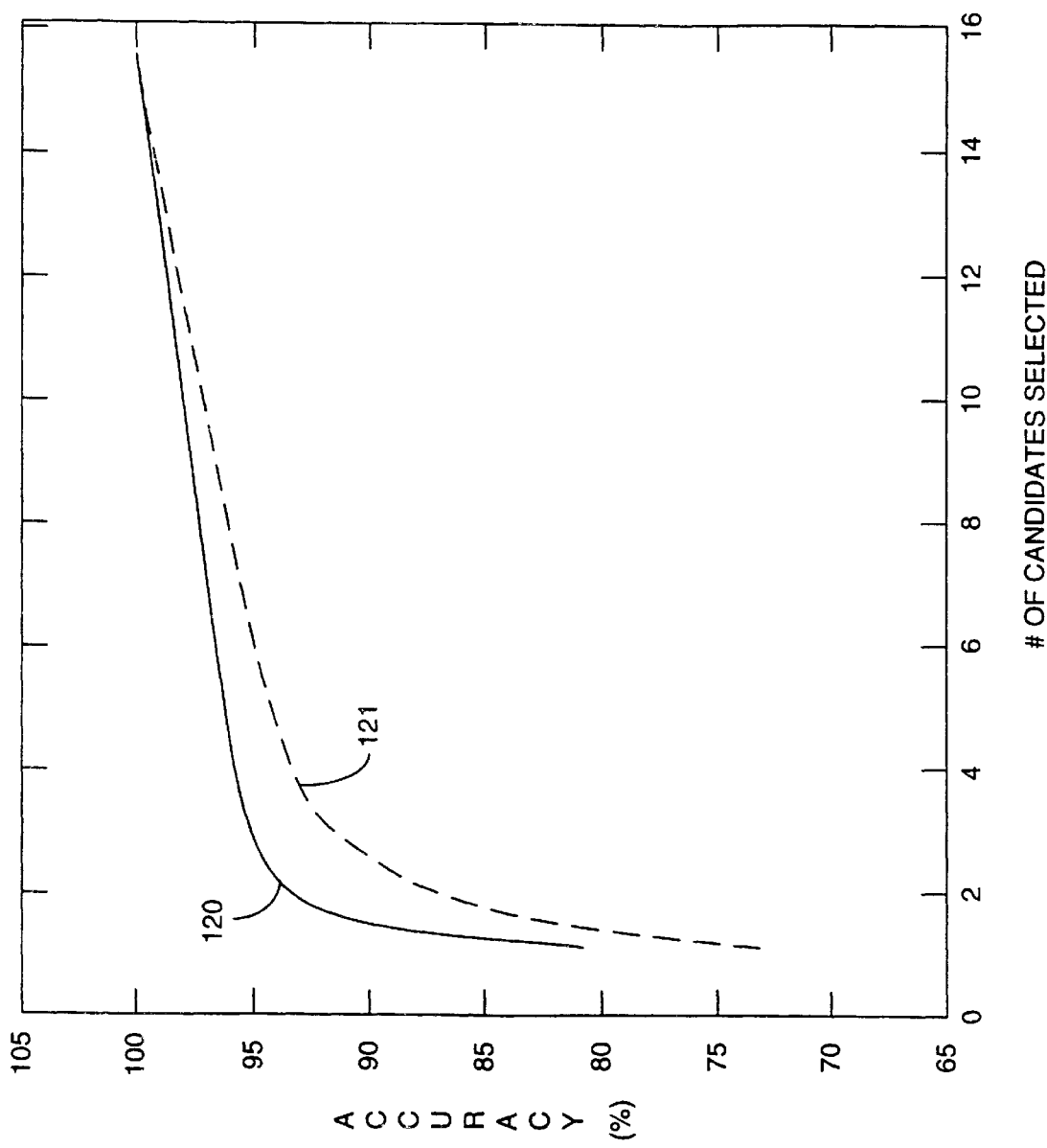
FIG. 4 is a graph comparing the performance of document segmentation type basis document signatures and low-resolution image type basis document signatures in the method according to the invention.

FIG. 4 is a graph which indicates the experimentally derived relative performance of segmentation type document signatures like those shown in FIGS. 3A–3C and low-resolution image type document signatures like those shown in FIGS. 2A–2C. In the experiment 18 different document type distributions were compared. Each document type distribution was prepared by consolidating the information from between 20 and 200 basis document signatures. The x-axis of the graph indicates the number of candidate document types that the method according to the invention was allowed to pick with adaptive candidate selection (discussed below). The y-axis of the graph indicates the accuracy of the method according to the invention in percent. The mean performance of the low-resolution image type document signatures is shown by the solid line 120 while the mean performance of the segmentation type document signatures is shown by the dashed line 121. These results were found experimentally using a 5 dpi resolution with a Weighted Bayesian method of selection (discussed below). The results clearly indicate that low-resolution image type document signatures provide significantly greater accuracy when fewer than six candidates are selected.

Figure 5:
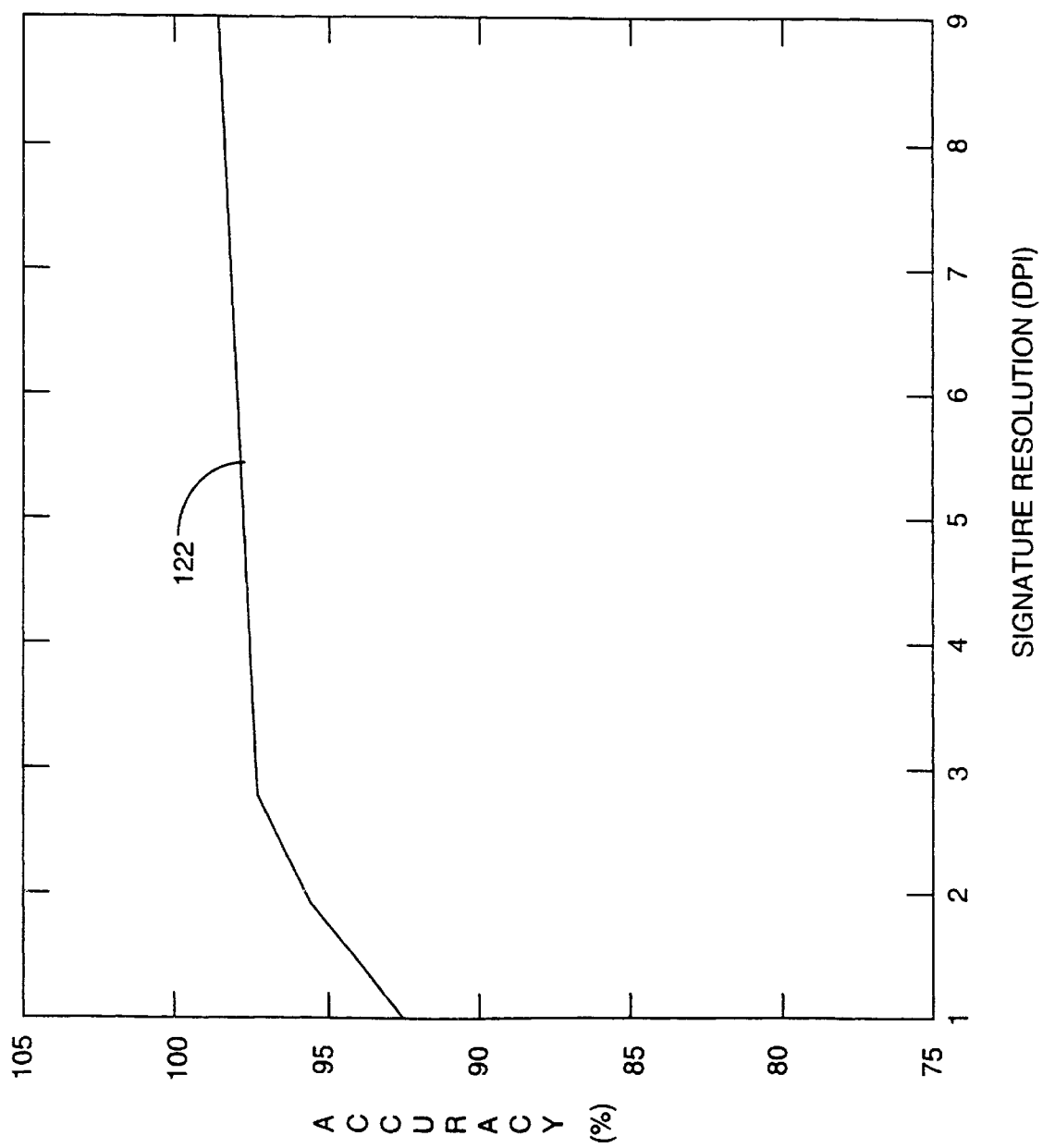
FIG. 5 is a graph comparing the performance of low-resolution image type basis document signatures of various resolutions in the method according to the invention.

FIG. 5 is a graph which indicates the experimentally derived relative performance at various resolutions of low-resolution image type document signatures in the method according to the invention. In the experiment 18 different document type distributions were provided. Each document type distribution was prepared from between 20 and 200 basis document signatures of the low-resolution type tested at various resolutions between 1 and 9 dpi. The x-axis of the graph indicates the resolution of the document signature in dpi while the y-axis of the graph indicates the accuracy of the method according to the invention in percent. The mean performance of the low-resolution image type document signatures at various resolution is shown by the solid line 122. These results were found experimentally using adaptive candidate selection with an average of two output candidates (discussed below) and with a Weighted Bayesian method of selection (discussed below). The results clearly indicate that only marginal increases in accuracy are achieved when the resolution of the low-resolution type document signatures is increased above 3 dpi.

Next, distances between the new document signature and each of the plurality of document type distributions are calculated (block 40). Thus, the method according to the invention has reduced the problem of classifying the new electronic document to a multi-class pattern recognition task. There are two extra assumptions we make, however, which affect the choice of technique used for the distance calculations. First, we assume that the number of classes into which the new document may be classified is not fixed (i.e., the user could add a new class of documents at any time). Second, we assume that the number of classes into which the new electronic document may be classified may be extremely large. These assumptions encourage separation or scoring methods that do not require knowledge of the whole space, or at least offer cheap updating schemes upon the addition of new classes. For example, a method which offers 100% separation of classes but requires heavy re-computation upon addition of a new class is inefficient. On the other hand, a method which can reliably determine a small subset of classes containing the correct class in at most some number log(N) guesses in the number of classes, but does not require extensive re-computation upon the addition of a new class, is preferable. One way this can be accomplished is by calculating the distances using an algorithm based on a Bayesian framework for a Gaussian distribution If the method of automatically classifying documents according to the invention is to be a preprocessing stage for some "heavier" system of extracting data from documents, the method according to the invention should be able to select between the candidate classes offered to it, and if necessary reject them all. One effective way to accomplish this is to utilize approaches which emerge from the Bayesian decision rule. For purposes of this description, the plurality of document signatures will be denoted by $X_k^j$. The document class (type) number is represented by k=1, 2, 3, . . . C where C is a constant representing the total number of the plurality of document types. The basis document number is represented by j=1, 2, . . . , $N_k$ where $N_k$ is the total number of basis documents represented by the k-th document type distribution. We assume that $\{X_k^j\}_{j=1}^{N_k}$ are drawn from a Gaussian multivariate distribution $G \{M_k, \Sigma_k\}$ where $M_k$ is the multivariate mean and $\Sigma_k$ is the covariance matrix. Thus, the classification of the new document signature z is done by computing the Mahalanobis distances:

$$d_k = D(z, M_k, \Sigma_k) = (z-M_k)^T \Sigma_k^{-1}(z-M_k) \quad (1)$$

where T is the matrix transpose, and mapping z to the class $k_o$ with the minimal distance $d_{k_0} = \min\{d_1, d_2, \ldots, d_c\}$. Additionally, calculating distances may include heuristic methods for approximating the covariance matrix of each document type distribution. For clarity, the notation "$\Sigma_k^{-1}$" in equation (1), above indicates the inversion of the covariance matrix rather than a summation.

Next, based on the distances calculated, at least one candidate document type for the new electronic document from among the independent document types described by the plurality of document type distributions is selected (block 50). For purposes of this description, selecting at least one candidate document type may include indicating that none of the document types described by the plurality of document type distributions are good candidates. If a preselected fixed number of output candidates document types are desired, we may simply choose the preselected fixed number of candidate document types corresponding those of the plurality of document type distributions with the smallest distances. Another option is to choose all the candidate document types corresponding to those of the plurality of document type distributions having a distance within some fixed distance of the minimal distance. For purposes of this description, this second technique will be called "adaptive candidate selection." Clearly adaptive candidate selection will result in a variable number of candidate document types being proposed by the method according to the invention, however the percentage threshold may be adjusted to specify the average number of candidates returned in repeated uses of the method according to the invention. It has been found experimentally that the variance in the number of output candidate document types proposed is low. Thus, the probability is low of the method according to the invention returning an unacceptably high number of candidate types with this technique allowing a variable number of candidates document types to be proposed.

Figure 6:
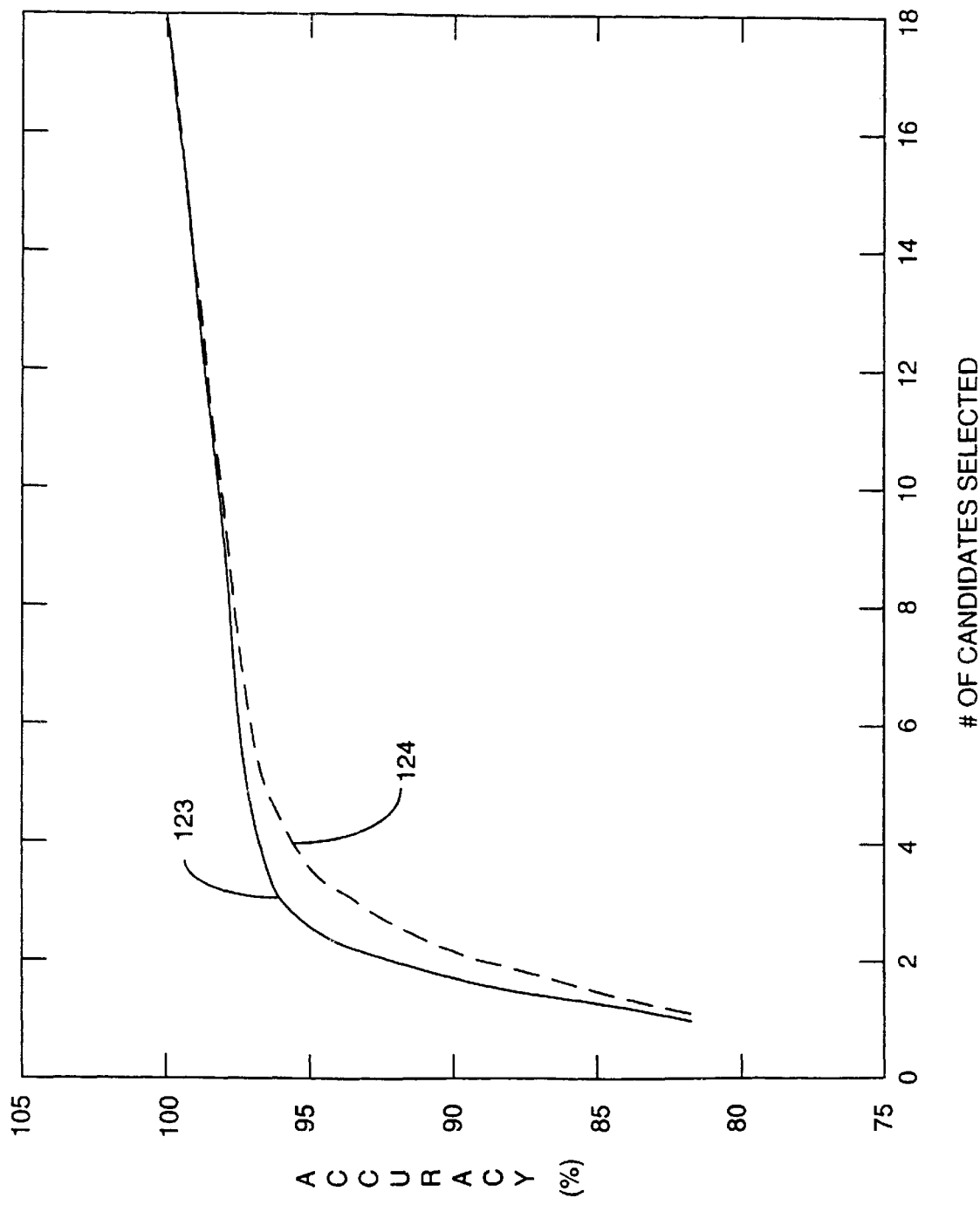
FIG. 6 is a graph comparing the performance of choosing a fixed number of candidates vs and adaptive number of candidates in the method according to the invention.

FIG. 6 is a graph which indicates the experimentally derived relative performance of selecting a fixed number of candidate document types and adaptive candidate selection. In the experiment 18 different document type distributions were tested. Each document type distribution was prepared from between 20 and 200 basis document signatures of the low-resolution type at a resolution of 5 dpi. The x-axis of the graph indicates the number of candidate document types that the method according to the invention was allowed to pick as either a preselected fixed number of selections or an average number for adaptive candidate selection. The y-axis of the graph indicates the accuracy of the method according to the invention in percent. The mean performance of the adaptive candidate selection is shown by the solid line 123 while the mean performance of the fixed number of selections is shown by the dashed line 124. These results were found with a Weighted Bayesian method of selection (discussed below). The results clearly indicate that adaptive candidate selection has a marked advantage in accuracy over fixed number candidate selection when less than six candidates are selected.

According to standard practice in the art, the unknown moments $M_k$ and $\Sigma_k$ in equation (1), above, may be estimated based on the basis document data by:

$$M_k = \frac{1}{N_k} \sum_{j=1}^{N_k} X_k^j, \text{ and} \quad (2)$$

$$\sum\nolimits_k = \frac{1}{N_k} \sum_{j=1}^{N_k} (X_k^j - M_k)(X_k^j - M_k)^T, \text{ respectively.} \quad (3)$$

One problem that may be encountered using the above estimation of $\Sigma_k$ is that even for small document signatures which contain only a few hundred pixels, the memory and computation requirements of these matrices may be excessive on today's computing platforms. This problem can be overcome, however, by totally disregarding the second moments, and use the Euclidean distances calculated as follows:

$$d_k = D(z, M_k, I) = (z-Mk)^T(z-Mk) = \|z-Mk\|^2 \quad (4).$$

For purposes of this description, this method of calculating the distances between the new document signature and the plurality of document signatures will be referred to as the Simple Bayesian method.

Another option for reducing the memory and computation requirements of the method according to the invention is to use some simplified version of the matrices $\Sigma_k$. One way to do this is to use diagonal matrices $\Delta_k$, which effectively introduces weights to the Euclidean distance as shown in equation 5, below:

$$d_k = D(z, M_k, \Delta_k) = (z-M_k)^T \Delta_k^{-1}(z-M_k) = \|z-M k\|_{\Delta_k}^2 \quad (5).$$

For purposes of this description, this method of calculating the distances between the new document signature and the plurality of document signatures will be referred to as the Weighted Bayesian method.

The Weighted Bayesian method is a generalization of the previous algorithm (4) which may be seen by choosing $\Delta_k$ to be the identity matrix (i.e., a C×C matrix filled with zeros except for the diagonal which is filled with ones). Thus, the weighted approach is potentially better, if the appropriate weights are used. The natural choice for the weights $\Delta_k$ is to use the main diagonal of $\Sigma_k$ such that $\Delta_k$=Main Diagonal$\{\Sigma_k\}$. It has been experimentally determined, however that the choice of $\Delta_k$=Main Diagonal$\{\Sigma_k\}$ results in poorer performance.

The main diagonal values of the matrix $\Sigma_k$ actually represent the standard deviation ("spread") of each pixel value around its mean value for all basis documents of a particular document type. Instead, the value that has been shown to work more effectively is the value of the ratio of: a) the spread of each pixel value around the mean pixel value for all basis documents within a particular document type to b) the spread of each pixel value for all basis documents across all the known document types around the same mean pixel value. For example, assume that the first pixel in the first document type has a mean value of 50, and a spread of 15 for all basis documents of that document type. If we then compute that the spread around 50 for all basis documents of all the known document types (those that have document signatures) is also 15, this implies that this pixel value is not reliable to be used for distinguishing between document types and this pixel should therefore get a small weight. If, on the other hand, we compute that the spread around 50 for all basis documents of all the known document types is instead 100, this implies that this pixel value is reliable as it can be counted strongly in distinguishing between document types and should be given high weight. To summarize, the following matrices $\Delta_k$ improve the performance of the method according to the invention markedly:

$$\Delta_{k_0}(i) = \sqrt{1 - \frac{\text{Spread within Class}}{\text{Spread for all Classes}}} = \sqrt{1 - \frac{\frac{1}{N_{k_0}} \sum_{j=1}^{N_{k_0}} (X_{k_0}^j(i) - M_{k_0}(i))^2}{\frac{1}{\sum_{k=1}^{C} N_k} \sum_{k=1}^{C} \sum_{j=1}^{N_k} (X_k^j(i) - M_{k_0}(i))^2}} \quad (6)$$

Figure 7:
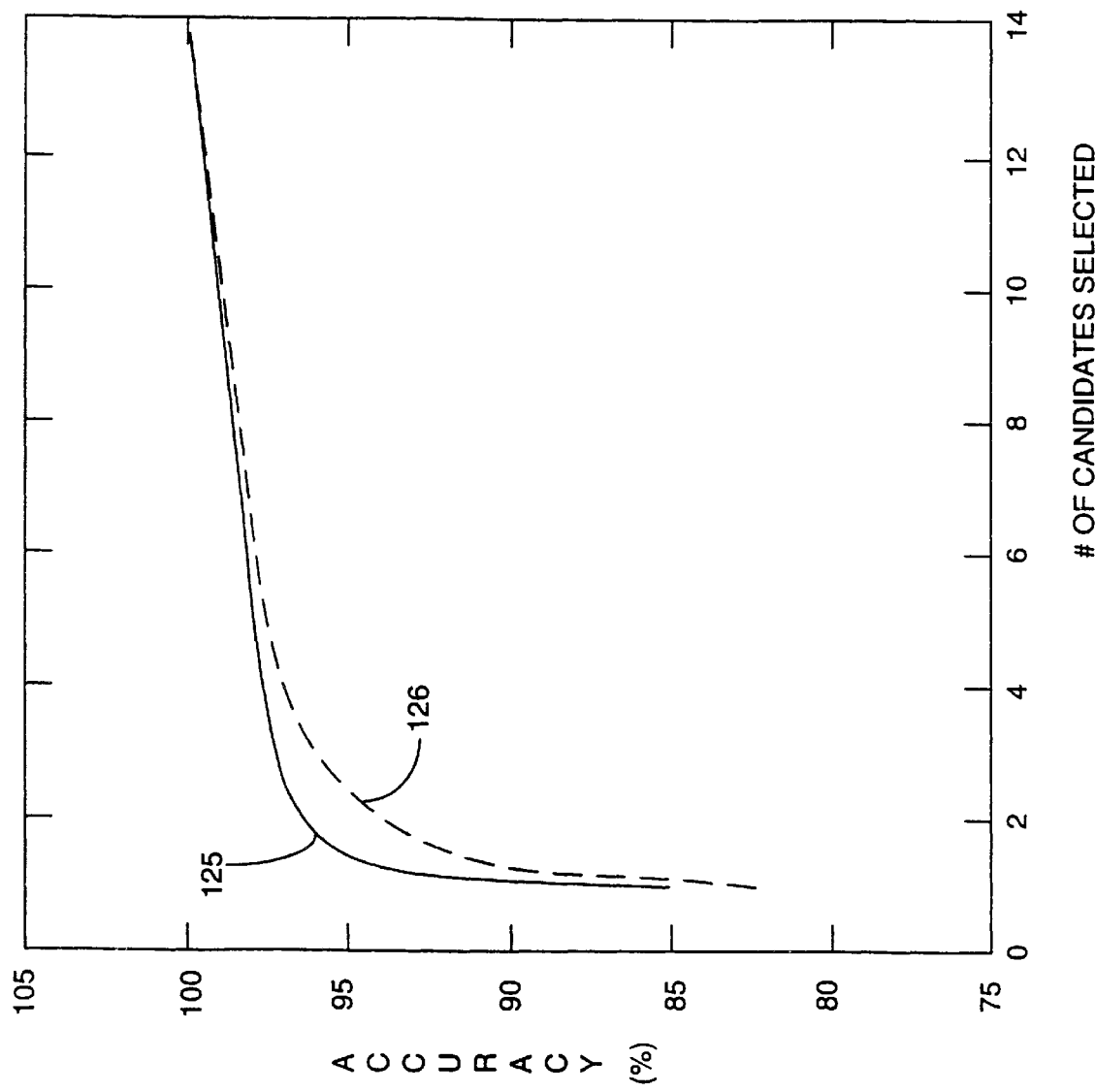
FIG. 7 is a graph comparing the performance of calculating distances with a Simple Bayesian method vs. calculating distances with a Weighted Bayesian method.

FIG. 7 is a graph which indicates the experimentally derived relative performance of using a Simple Bayesian method and using a Weighted Bayesian method. In the experiment 18 different document type distributions were tested. Each document type distribution was prepared from between 20 and 200 basis document signatures of the low-resolution type at a resolution of 5 dpi. The x-axis of the graph indicates the number of candidate document types that the method according to the invention was allowed to pick using adaptive candidate selection. The y-axis of the graph indicates the accuracy of the method according to the invention in percent. The mean performance of the Weighted Bayesian method is shown by the solid line 125 while the mean performance of the Simple Bayesian method is shown by the dashed line 126. The results clearly indicate that the Weighted Bayesian method has a marked advantage in accuracy over the Simple Bayesian method when less than four candidates are selected.

No matter which signature type, resolution, candidate selection technique, or calculation method is chosen, the results of the method according to the invention may be output (block 60) directly to a user, or to an expert system for further processing of the new electronic document.

In addition to the method described above, another preferred embodiment of the invention is a program storage medium readable by computer, tangibly embodying a program of instructions executable by the computer to perform the method steps described above. In this embodiment, the various steps described above are performed by a computer. In light of this fact and in order to provide a more detailed description of the method according to the invention, a listing of pseudo code for running the method on a computer is attached.

Although a specific embodiment of the invention has been described and illustrated, the invention is not to be limited to the specific forms or arrangements of parts so described and illustrated. The invention is limited only by the claims.

ATTACHMENT
PSEUDO CODE LISTING

```
Initialize( )
//////
// initial conditions:
//   for each document type, have a representative
sample of documents from that
//   document type
//////
```

-continued
ATTACHMENT
PSEUDO CODE LISTING

```
{
    // first need the signatures for all the sample documents,
    and the mean for each
    // type
    for (each document type k) {
        for (each sample document j of type k) {
            Create signature of document (j);
        }
        Compute the sample mean M_k;    (eq(2))
    }
    // now can compute the pixel weights for each document type
    (requires means of
    // all types)
    for (each document type k) {
        Compute the pixel weights Δk;    (eq (6))
    }
}
ScoreNewDocument( )
//////
// scoring new document:
//     given the mean and weights for each document type,
find the distances of the
//     new document signature z from all the document type distributions
//////
{
    // first need the signature of the new document
    Create signature z of new document;
    // now compute the distance of this signature from all
    the document type
    // distributions (requires the means and weights for each
    document type)
    for (each document type k) {
        Compute distance d_k from z to document type k;    (eq (5))
    }
    // finish with a vector of distances d_k for each document type
}
//////
// select candidate document types:
//     given the vector of distances d_k for each document type,
return candidate
//     document types, two selection methods
//////
SelectThreshold(t)
// method [1]- t is a value between 0 and 1 such that
100 t is the percentage threshold
{
    // first find the candidate giving the minimal
    distance and add it to the candidate
    // list
    Find the document type k_min giving the minimal distance d_min;
    Add k_min to the candidate list;
    // now go through each document type and add those which
    fall within t of the
    // minimum to the candidate list
    for (each document type k) {
        if(d_k <= ( 1 + t )d_min) {
            Add k to the candidate list;
        }
    }
    return candidate list
}
SelectNumber(n)
// method[2]- n is an integer between 1 and C (the number of
document types)
{
    return the n document types giving the n smallest distances;
}
```

We claim:

1. A method of automatically classifying electronic documents using document signatures, the method comprising:
   (a) providing a plurality of document type distributions, each document type distribution describing layout characteristics of an independent document type and including data derived from at least one basis document signature from an independent basis document of the independent document type;

(b) providing a new electronic document;

(c) creating an new document signature describing layout characteristics of the new electronic document;

(d) calculating distances between the new document signature and each of the plurality of document type distributions; and (e) selecting, based on the distances calculated in step (d), at least one candidate document type for the new electronic document from among the independent document types described by the plurality of document type distributions.

2. The method of claim 1, in which calculating the distances in step (d) includes using an algorithm based on a Bayesian framework for a Gaussian distribution.

3. The method of claim 1, in which:

the at least one basis document signature in step (a) includes data defining pixels of a low-resolution image of the independent basis document; and the new document signature in step (c) includes data defining pixels of a low-resolution image of the new electronic document.

4. The method of claim 3, in which the data derived from at least one basis document signature in step (a) includes a multiple representative statistic value across each of the at least one basis document signatures of each of the pixels of the low-resolution image.

5. The method of claim 3, in which:

the low-resolution image of the independent basis document is resolved to between 1 and 75 dots per inch; and the low-resolution image of the new electronic document is resolved to between 1 and 75 dots per inch.

6. The method of claim 1, in which:

the at least one basis document signature in step (a) includes document segmentation data derived from the independent basis document of the independent document type; and the new document signature in step (c) includes document segmentation data derived from the new electronic document.

7. The method of claim 6, in which the data derived from at least one basis document signature in step (a) includes a multiple representative statistic across each of the at least one basis document signature of document segmentation data.

8. The method of claim 2, in which selecting the at least one candidate document type in step (e) includes selecting a preselected fixed number of independent document types described by the preselected fixed number of the plurality of document type distributions calculated in step (d) to have the preselected fixed number of shortest distances.

9. The method of claim 2, in which selecting the at least one candidate document type in step (e) includes selecting the independent document types described by those of the plurality of document type distributions having distances calculated in step (d) within a preselected threshold distance of a minimal distance calculated in step (d).

10. The method of claim 2, in which the distances calculated in step (d) are Euclidean distances.

11. The method of claim 2, in which the distances calculated in step (d) are Mahalanobis distances.

12. The method of claim 2, in which:

each of the plurality of document type distributions provided in step (a) includes a plurality of data points; and calculating distances in step (d) includes weighting the value given each of the plurality of data points based on a calculated reliability of each of the plurality of data points.

13. The method of claim 11, in which the calculated reliability of each of the plurality of data points includes the ratio of:

a spread of each of the plurality of data points within each of the plurality of document type distributions, respectively, to a spread of each of the plurality of data points across all of the plurality of document type distributions, respectively.

14. A program storage medium readable by a computer, tangibly embodying a program of instructions executable by the computer to perform method steps for automatically classifying electronic documents using document signatures, the method steps comprising:

(a) providing a plurality of document type distributions, each document type distribution describing layout characteristics of an independent document type and including data derived from at least one basis document signature from an independent basis document of the independent document type;

(b) providing a new electronic document;

(c) creating an new document signature describing layout characteristics of the new electronic document;

(d) calculating distances between the new document signature and each of the plurality of document type distributions using an algorithm based on a Bayesian framework for a Gaussian distribution; and (e) selecting, based on the distances calculated in method step (d), at least one candidate document type for the new electronic document from among the independent document types described by the plurality of document type distributions.

15. The program storage medium of claim 14, in which:

the at least one basis document signature in method step (a) includes data defining pixels of a low-resolution image of the independent basis document; and the new document signature in method step (c) includes data defining pixels of a low-resolution image of the new electronic document.

16. The program storage medium of claim 15, in which:

the low-resolution image of the independent basis document is resolved to between 1 and 75 dots per inch; and the low-resolution image of the new electronic document is resolved to between 1 and 75 dots per inch.

17. The program storage medium of claim 14, in which:

the at least one basis document signature in method step (a) includes document segmentation data derived from the independent basis document; and the new document signature in method step (c) includes document segmentation data derived from the new electronic document.

18. The program storage medium of claim 14, in which selecting the at least one candidate document type in method step (e) includes selecting a preselected fixed number of independent document types described by the preselected fixed number of the plurality of document type distributions calculated in method step (d) to have the preselected fixed number of shortest distances.

19. The program storage medium of claim 14, in which in which selecting the at least one candidate document type in method step (e) includes selecting the independent document types described by those of the plurality of document type distributions having distances calculated in method step (d) within a preselected threshold distance of a minimal distance calculated in method step (d).

20. The program storage medium of claim 14, in which the distances calculated in method step (d) are Euclidean distances.

21. The program storage medium of claim 14, in which:

each of the plurality of document type distributions provided in method step (a) includes a plurality of data points; and calculating distances in method step (d) includes weighting the value given each of the plurality of data points based on a calculated reliability of each of the plurality of data points.

22. A program storage medium of claim 21, in which in which the calculated reliability of each of the plurality of data points includes the ratio of:

a spread of each of the plurality of data points within each of the plurality of document type distributions, respectively, to a spread of each of the plurality of data points across all of the plurality of document type distributions, respectively.

\* \* \* \* \*